United States Patent
Singh et al.

(10) Patent No.: US 7,300,492 B2
(45) Date of Patent: Nov. 27, 2007

(54) AMMONIUM DODECAMOLYBDOMOLYBDATE AND METHOD OF MAKING

(75) Inventors: Raj P. Singh, Sayre, PA (US); Thomas A. Wolfe, Towanda, PA (US); David L. Houck, Towanda, PA (US)

(73) Assignee: Osram Sylvania Inc., Danvers, MA (US)

( * ) Notice: Subject to any disclaimer, the term of this patent is extended or adjusted under 35 U.S.C. 154(b) by 700 days.

(21) Appl. No.: 10/931,910

(22) Filed: Sep. 1, 2004

(65) Prior Publication Data

US 2005/0034562 A1    Feb. 17, 2005

Related U.S. Application Data

(62) Division of application No. 10/207,503, filed on Jul. 29, 2002, now Pat. No. 6,793,907.

(51) Int. Cl.
   *B22F 9/18*   (2006.01)
   *B22F 9/20*   (2006.01)
   *B22F 9/22*   (2006.01)
   *C01B 31/34*  (2006.01)

(52) U.S. Cl. ........................................ 75/369; 423/440

(58) Field of Classification Search ................ 75/369, 75/611; 423/440
   See application file for complete search history.

(56) References Cited

U.S. PATENT DOCUMENTS

| 3,899,284 A | * | 8/1975 | Stanley | 423/593.1 |
| 4,079,116 A | | 3/1978 | Ronzio et al. | 423/56 |
| 6,022,395 A | * | 2/2000 | Eckert et al. | 75/365 |
| 6,207,609 B1 | * | 3/2001 | Gao et al. | 502/177 |
| 6,569,222 B2 | * | 5/2003 | McCormick | 75/369 |
| 6,746,656 B2 | * | 6/2004 | Khan et al. | 423/345 |
| 2003/0213338 A1 | * | 11/2003 | Khan et al. | 75/369 |
| 2004/0067190 A1 | * | 4/2004 | Khan et al. | 423/440 |

OTHER PUBLICATIONS

Singh et al., *Synthesis of Dodecamolybdoantimonate (V) Salts containing the Keggin Structure*, J. Chem. Soc. Dalton Trans. (1990) 947-951, no month.

* cited by examiner

*Primary Examiner*—Wayne A. Langel
(74) *Attorney, Agent, or Firm*—Robert F. Clark

(57) ABSTRACT

A novel molybdenum compound, ammonium dodecamolybdomolybdate (AMM), is described which may be used in the manufacture of molybdenum metal and molybdenum carbide powders. The molybdenum compound is a dodecaheteropoly acid salt having a Keggin-type structure wherein molybdenum resides in both the hetero as well as peripheral atomic positions. The novel compound has the general formula $(NH_4)_2Mo_{12}MoO_{40} \cdot 6H_2O$. Because of its low solubility, the compound can be crystallized efficiently and at a high purity from ammonium molybdate solutions.

6 Claims, 4 Drawing Sheets

AMMONIUM DODECAMOLYBDOMOLYBDATE AND METHOD OF MAKING

CROSS REFERENCES TO RELATED APPLICATIONS

This application is a division of application Ser. No. 10/207,503, filed Jul. 29, 2002, now U.S. Pat. No. 6,793,907.

TECHNICAL FIELD

This invention relates to molybdenum compounds and their methods of making. More particularly, this invention relates to heteropoly molybdenum compounds having a Keggin-type structure.

BACKGROUND OF THE INVENTION

Ammonium dimolybdate (ADM), $(NH_4)_2Mo_2O_7$, and ammonium paramolybdate (APM), $(NH_4)_6Mo_7O_{24}\cdot4H_2O$, are well-known molybdenum compounds which are used as raw materials in the manufacture of molybdenum metal and molybdenum carbide powders. See, e.g., U.S. Pat. No. 4,079,116. Both compounds are highly soluble in water, up to 200 g Mo/l, and are formed primarily by crystallization from aqueous solutions of ammonium molybdate. The efficiency of the crystallization process and the achievable purity of these compounds is affected by their high aqueous solubility. Because the solutions must be highly concentrated to induce crystallization, the supersaturation point for some of the impurities is also reached resulting in co-crystallization. In addition, common ion effects further induce co-crystallization of impurities, particularly anionic species. Therefore, to avoid incorporation of impurities in the crystallized product, only 70 to 80% of the molybdenum values are typically crystallized from the solutions.

Both of the ADM and APM compounds also contain relatively high percentages of ammonia which can be problematic when directly reducing the compounds to form molybdenum metal. In particular, the large amount of ammonia released during reduction is an environmental concern requiring its removal from the exhaust stream and disposal of the associated waste products.

SUMMARY OF THE INVENTION

It is an object of the invention to obviate the disadvantages of the prior art.

It is another object of the invention to provide a molybdenum compound for making molybdenum metal and carbide powders.

It is yet another object of the invention to provide a molybdenum compound with can be manufactured efficiently and at high purity.

In accordance with one object of the invention, there is provided a molybdenum compound having the general formula $(NH)_2Mo_{12}MoO_{40}\cdot6H_2O$ wherein the compound is a dodecaheteropoly acid salt having a Keggin-type structure with molybdenum at the hetero and peripheral atomic positions.

In accordance with another object of the invention, there is provided a method for forming the molybdenum compound wherein an ammonium molybdate solution is acidified to obtain a normality of from 0.5 to 1.5 N, and the molybdenum compound is crystallized therefrom.

DETAILED DESCRIPTION OF THE INVENTION

Figure 1:
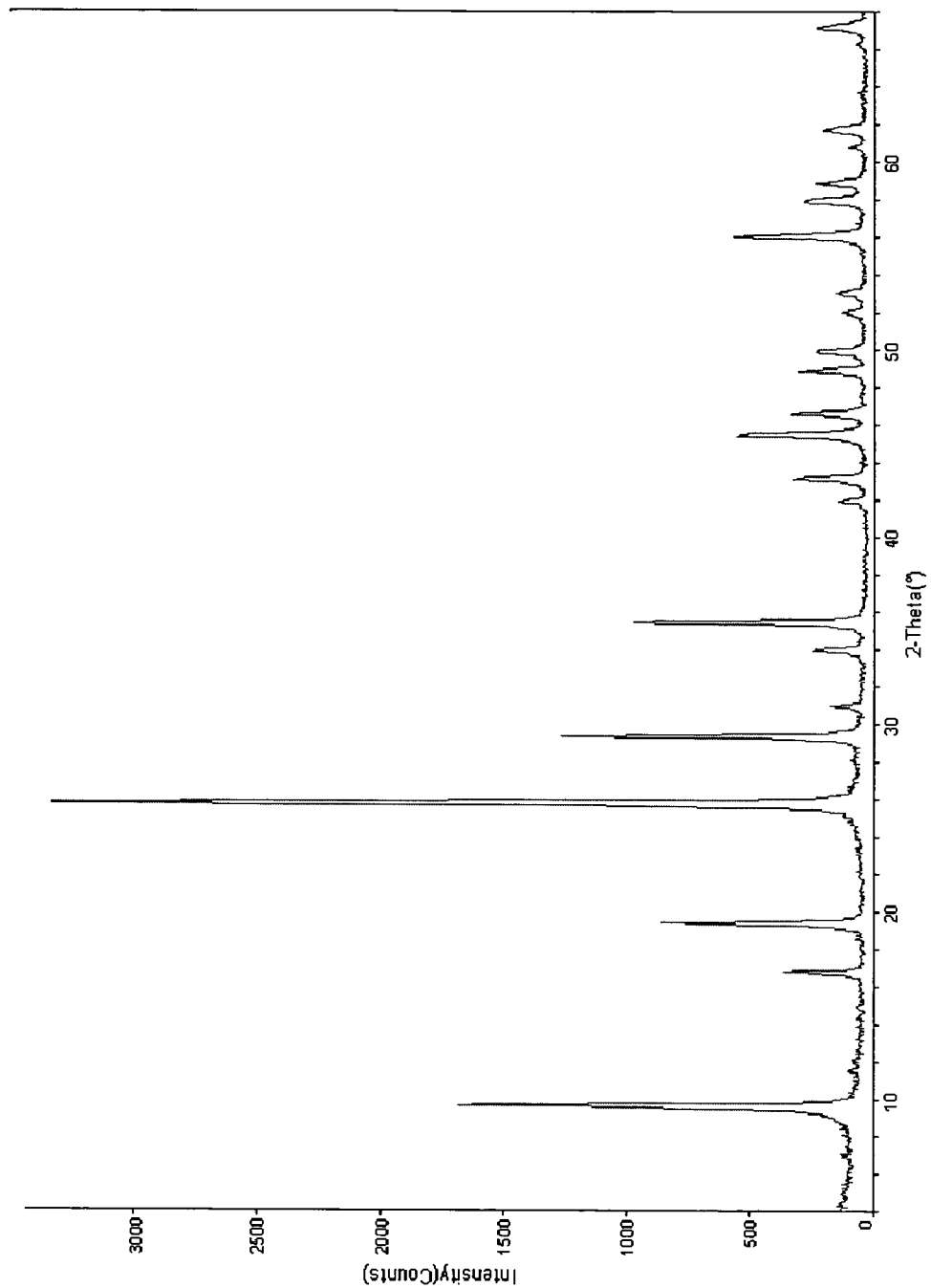
FIG. 1 is an x-ray diffraction pattern of the ammonium dodecamolybdomolybdate compound of this invention.

For a better understanding of the present invention, together with other and further objects, advantages and capabilities thereof, reference is made to the following disclosure and appended claims taken in conjunction with the above-described drawings.

A novel molybdenum compound, ammonium dodecamolybdomolybdate (AMM), has been invented which may be used in the manufacture of molybdenum metal and molybdenum carbide powders. The molybdenum compound is a dodecaheteropoly acid salt having a Keggin-type structure wherein molybdenum resides in both the hetero as well as peripheral atomic positions. The novel compound has the general formula $(NH_4)_2Mo_{12}MoO_{40}\cdot6H_2O$ (FW=2032 g/mole, Mo=61.4%, $NH_3$=1.7%, $H_2O$=5.3%). X-ray diffraction analysis shows that this compound is isostructural to ammonium dodecamolybdoantimonate which has been described by in the literature by Singh et al., *Synthesis of dodecamolybdoantimonate(V) salts containing the Keggin structure*, J. Chem. Soc. Dalton Trans., 1990, 947-951. However, unlike the antimonate which forms cauliflower-type crystals, the ammonium dodecamolybdomolybdate of this invention forms hexagonal rod-type crystals having a length of between 10 to 20 µm.

The synthesis of AMM has significant advantages since the compound is only slightly soluble in water (1-3 g Mo per liter) and therefore can be crystallized from ammonium molybdate solutions with higher efficiency and purity than ammonium dimolybdate or ammonium paramolybdate. In addition, AMM can be prepared from less expensive sodium molybdate feeds without sodium contamination. The low solubility of AMM provides greater control over the crystallization process making it easier to avoid co-crystallization of impurities.

Since AMM contains much less ammonia per mole than ammonium dimolydate (ADM) and ammonium paramolybdate (APM), its reduction to molybdenum metal powder is simpler than ADM and APM. The reduction of AMM can also be manipulated to form different-sized mono-morphic molybdenum metal powders including submicron-size powders. This is particularly important because submicron-size (<1 µm) metal powders have distinct advantages over larger, micron size (>1 µm) powders. For example, the use of submicron-size metal powders greatly improves sinterability and mass transport at temperatures well below the sintering temperatures required for micron-size powders. Preferably, AMM is reduced in a hydrogen atmosphere at a temperature from 500-1100° C. for 2 to 6 hours to form molybdenum metal powders.

AMM may also be carburized to form a high-surface-area molybdenum carbide powder. In a preferred method, crystals of AMM are formed in the presence of a calculated amount of a high-surface-area carbon powder and converted into aggregates of $MO_2C$ by heating at a temperature at or below 1050° C. in $H_2$ gas. Preferably, carburization is performed by heating to a temperature in the range from 840 to 1140° C. for 2 to 6 hours. This direct method is simpler and less expensive than prior methods.

The following non-limiting examples are presented.

EXAMPLE 1

Preparation of Ammonium Dodecamolybdomolybdate (AMM)

An ammonium molybdate solution was formed by optionally dissolving 38 g ammonium dimolybdate, 42.4 g ammonium heptamolybdate, or 58 g sodium molybdate in 400 ml water and heating the solution to about 70° C. A 150 ml volume of aqua regia (3 parts 10-12N HCl to 1 part 15-16N $HNO_3$, by volume) was added to the molybdate solution while mixing with a magnetic stirrer. A 100 ml quantity of a $NH_4OH$ solution (1 part 14.5 M $NH_4OH$ to 1 part water) was then added with continuous stirring. A clear solution having light yellow color formed and AMA was precipitated by adding 40 ml of 15-16N $HNO_3$ with continuous stirring. The solution was continued to be heated at 70° C. for another 5 to 10 minutes and then left to crystallize. After about 15 minutes, a yellow precipitate formed. The precipitate was left in the mother liquor for from about 1 to 24 hours and then separated by filtration. The precipitate was washed once with 200 ml of 0.1M $HNO_3$ and dried at 110° C. The dried precipitate was characterized by x-ray diffraction (XRD), x-ray fluorescence (XRF), infrared spectroscopy (IR), scanning electron microscopy (SEM), energy dispersive x-ray analysis (EDAX) and chemical analysis.

Figure 2:
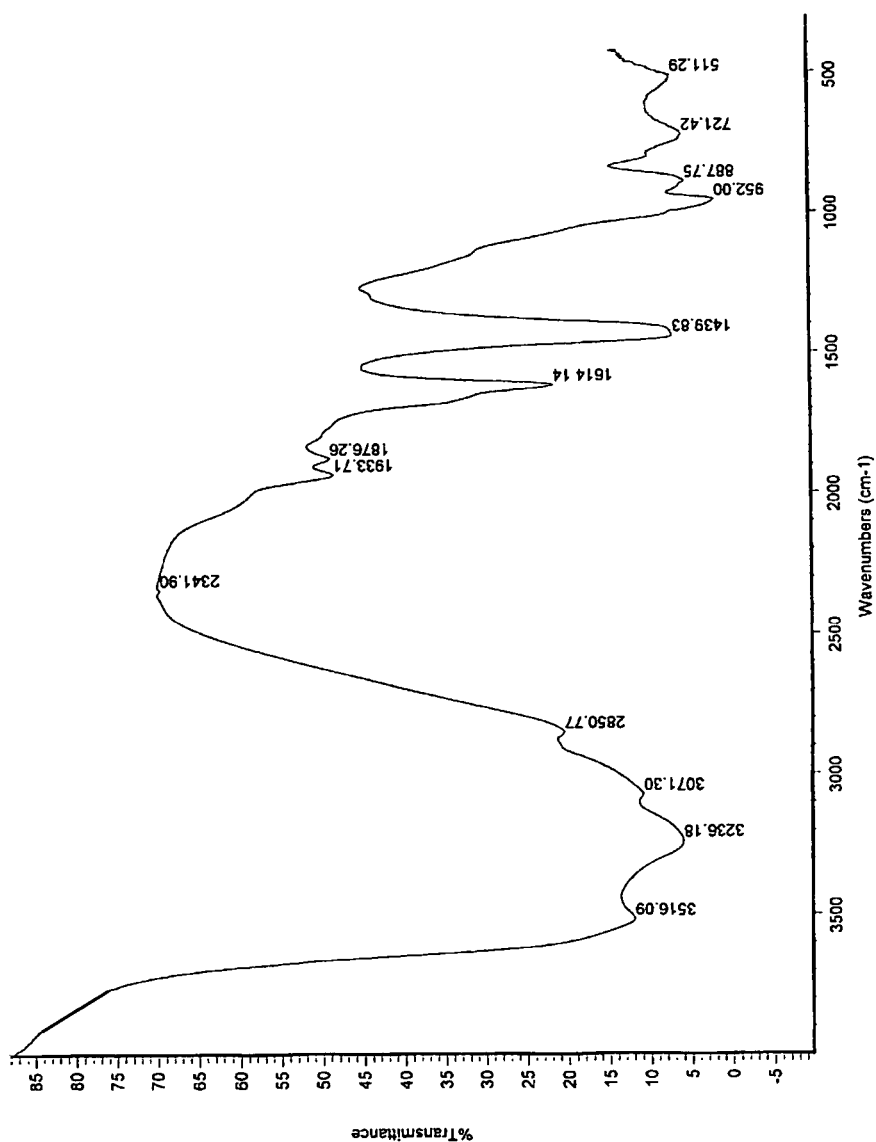
FIG. 2 is an infra-red spectrum of the ammonium dodecamolybdomolybdate compound of this invention.
Figure 3:
FIG. 3 is a scanning electron photomicrograph showing the hexagonal rod-shaped crystals of the ammonium dodecamolybdomolybdate compound of this invention.

Chemical analysis of the AMM precipitate demonstrated experimental values for Mo at 63% and N at 1.8% were close to their theoretical values (Mo=61.4, N=1.4%) based on the general formula, $(NH)_2Mo_{12}MoO_{40} \cdot 6H_2O$. X-ray diffraction (FIG. 1) and infrared (FIG. 2) analyses indicated that AMM is a typical heteropoly acid compound having a Keggin-type structure. The x-ray diffraction data for AMM is provided in Table 1 (Cu anode 40 kV, 30 mA). All the observed lines presented in the XRD spectrum of AMM were indexed for a body-centered cubic lattice with a lattice parameter $a_0$=12.907±0.001 Å. This value of $a_0$ was similar to value of 12.908±0.01 Å reported for ammonium dodecamolybdoantimonate. This suggests that AMM is isostructural to AMA with almost the same unit cell parameter. This seems reasonable in the light of the fact that the ionic radius of $Sb^{5+}$ is similar to that of $Mo^{6+}$. FIG. 3 is an scanning electron micrograph (SEM) showing the hexagonal rod-shaped morphology of the AMM crystals.

TABLE 1

X-ray Diffraction Data for AMM

| h | k | l | $d_{cal}$ | $d_{obs}$ | $I/I_0$ |
|---|---|---|---|---|---|
| 1 | 1 | 0 | 9.13 | 9.07 | 52 |
| 2 | 1 | 1 | 5.27 | 5.25 | 11 |
| 2 | 2 | 0 | 4.56 | 4.55 | 28 |
| 3 | 2 | 1 | 3.45 | 3.44 | 100 |
| 4 | 1 | 1 | 3.04 | 3.04 | 33 |
| 4 | 2 | 0 | 2.89 | 2.88 | 3 |
| 4 | 2 | 2 | 2.63 | 2.63 | 6 |
| 5 | 1 | 0 | 2.53 | 2.53 | 26 |
| 6 | 0 | 0 | 2.15 | 2.15 | 3 |
| 5 | 3 | 2 | 2.09 | 2.09 | 10 |
| 5 | 4 | 1 | 1.99 | 1.99 | 16 |
| 6 | 2 | 2 | 1.95 | 1.95 | 9 |
| 4 | 4 | 4 | 1.86 | 1.86 | 7 |
| 5 | 4 | 3 | 1.83 | 1.83 | 5 |
| 7 | 2 | 1 | 1.76 | 1.76 | 3 |
| 6 | 4 | 2 | 1.72 | 1.72 | 3 |
| 6 | 5 | 1 | 1.64 | 1.64 | 14 |
| 7 | 4 | 1 | 1.59 | 1.95 | 8 |
| 8 | 2 | 0 | 1.57 | 1.57 | 5 |
| 6 | 6 | 0 | 1.52 | 1.52 | 1 |
| 7 | 4 | 3 | 1.50 | 1.50 | 5 |
| 7 | 5 | 2 | 1.46 | 1.46 | 1 |
| 8 | 4 | 2 | 1.41 | 1.41 | 1 |
| 6 | 5 | 5 | 1.39 | 1.39 | 5 |
| 9 | 3 | 0 | 1.36 | 1.36 | 7 |
| 9 | 4 | 1 | 1.30 | 1.30 | 2 |
| 10 | 2 | 0 | 1.27 | 1.27 | 2 |
| 6 | 6 | 6 | 1.24 | 1.24 | 1 |
| 10 | 3 | 1 | 1.23 | 1.23 | 2 |
| 8 | 5 | 5 | 1.21 | 1.21 | 1 |
| 8 | 6 | 4 | 1.20 | 1.20 | 1 |
| 11 | 1 | 0 | 1.17 | 1.17 | 2 |
| 10 | 5 | 1 | 1.15 | 1.15 | 2 |
| 10 | 5 | 3 | 1.12 | 1.12 | 3 |
| 10 | 6 | 0 | 1.11 | 1.11 | 1 |
| 10 | 6 | 2 | 1.09 | 1.09 | 1 |
| 11 | 5 | 0 | 1.07 | 1.07 | 1 |
| 10 | 6 | 4 | 1.05 | 1.05 | 2 |
| 11 | 6 | 1 | 1.03 | 1.03 | 2 |
| 9 | 9 | 0 | 1.01 | 1.01 | 1 |

EXAMPLE 2

AMM was prepared from a molybdenum process by-product containing 59.2 g/l ammonia, >200 g/l molybdenum and elemental impurities such as potassium, phosphorus, tungsten, aluminum, sodium, boron, copper, arsenic, and silicon. To recover molybdenum as AMM from the process by-product, 500 ml of process by-product was diluted with 1250 ml water and acidified with 250 ml 10-12N HCl. The resulting yellow solution was then heated to 70° C. for two hours to form a light-yellow AMM precipitate. The AMM precipitate was separated by filtration. The AMM crystals captured on the filter paper were washed with 200 ml water and then dried at 110° C. SEM and XRD confirmed the formation of AMM. A chemical analysis of the precipitate is provided in Table 2. The data demonstrates that AMM can be used to recover molybdenum from impure ammonium molybdate solutions with a high efficiency (>95%) and high purity.

TABLE 2

| Element | Concentration (ppm) |
|---|---|
| K | 22 |
| Ag | <5 |
| Al | <5 |
| As | <500 |
| B | <5 |
| Ba | <5 |

TABLE 2-continued

| Element | Concentration (ppm) |
|---|---|
| Be | <5 |
| Bi | <10 |
| Ca | <5 |
| Cd | <50 |
| Co | <10 |
| Cr | <5 |
| Cu | <5 |
| Fe | <10 |
| Ge | <5 |
| Mg | <5 |
| Mn | <5 |
| Ni | <5 |
| P | <500 |
| Pb | <10 |
| Sb | <10 |
| Si | <5 |
| Sn | <10 |
| Sr | <5 |
| Ta | <500 |
| Th | <500 |
| Ti | <10 |
| V | <10 |
| W | <500 |
| Zn | <10 |
| Zr | <100 |

EXAMPLE 3

Preparation of Molybdenum Metal Powder from AMM

Figure 4:
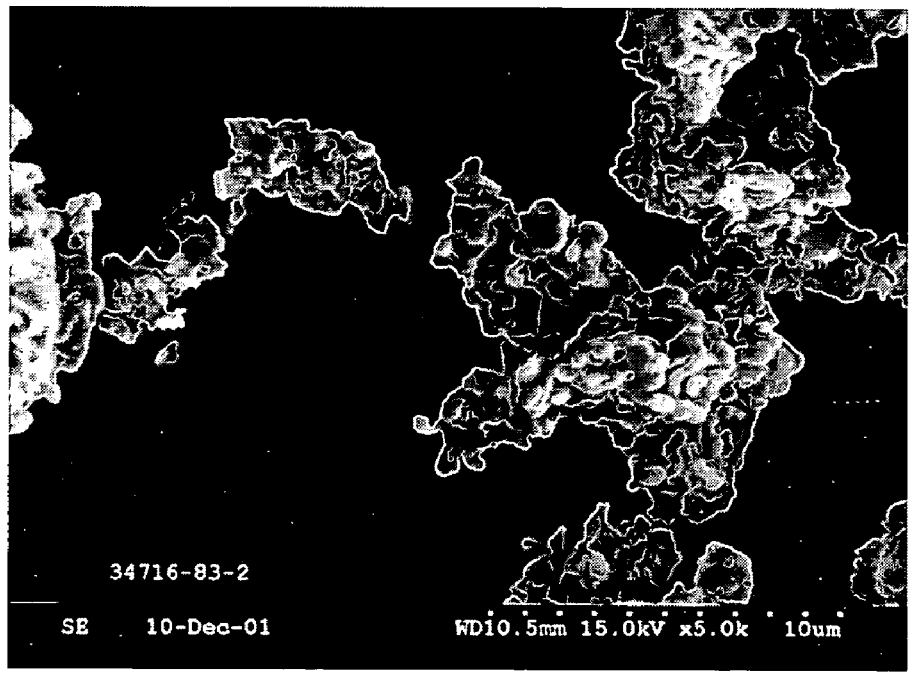
FIG. 4 is a scanning electron photomicrograph of a molybdenum metal powder made from the ammonium dodecamolybdomolybdate compound of this invention.

A 25 g amount of AMM powder was placed in a nickel-alloy boat and reduced in a tube furnace supplied with hydrogen at 0.3-0.4 liters per minute. The powder was heated at 10° C. per minute to 530° C., held for 1 hour at 530° C., and then heated to 1000° C. at 10° C. per minute. After being held for one hour at 1000° C., 15.5 g of molybdenum metal powder was obtained. The molybdenum powder was measured to have a BET specific surface area of 1.47 m$^2$/g, an FSSS particle size of 2.43 microns and a porosity of 0.832. The powder generally consisted of aggregates having a mean diameter of 13.29 microns. As can be seen in FIG. 4, the powder was mono-morphic, i.e., one morphological type (dog-bone shaped particles). This is different from molybdenum powder made from ADM which is typically bi-morphic comprising large octagonal particles and small dog-bone shaped particles.

EXAMPLE 4

Molybdenum metal powder was prepared according to the same procedure used in Example 3 except that 50 g of AMM powder was used and 31.1 g of molybdenum metal powder was obtained. The molybdenum powder had a BET specific surface area of 1.17 m$^2$/g, an FSSS particle size of 2.0 microns, and a porosity of 0.842. The bulk density was measured to be 12.44 g/in$^3$ The powder generally consisted of aggregates having a mean diameter of 9.5 microns. The powder was mono-morphic.

EXAMPLE 5

Preparation of Sub-micron Molybdenum Metal Powder from AMM

Figure 5:
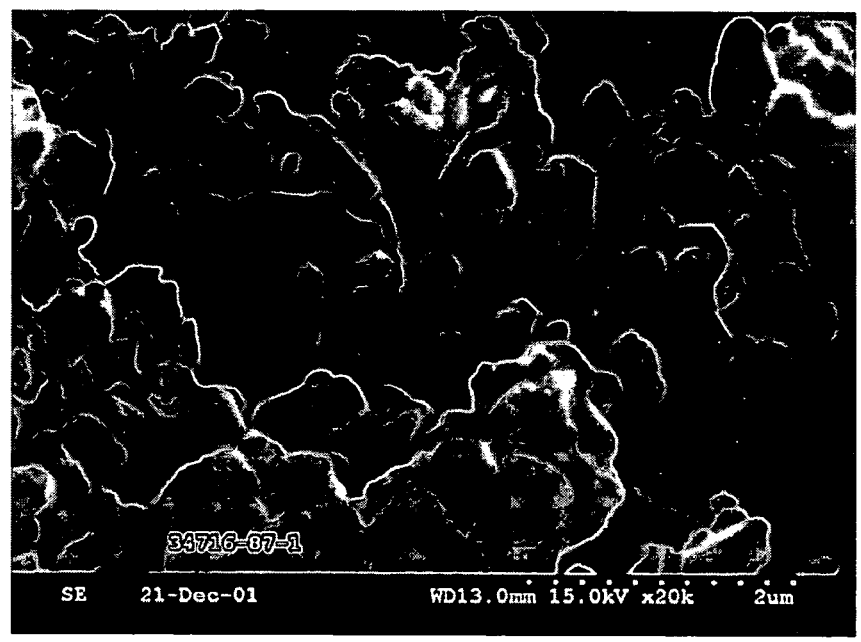
FIG. 5 is a scanning electron photomicrograph of a submicron molybdenum metal powder made from the ammonium dodecamolybdomolybdate compound of this invention.
Figure 6:
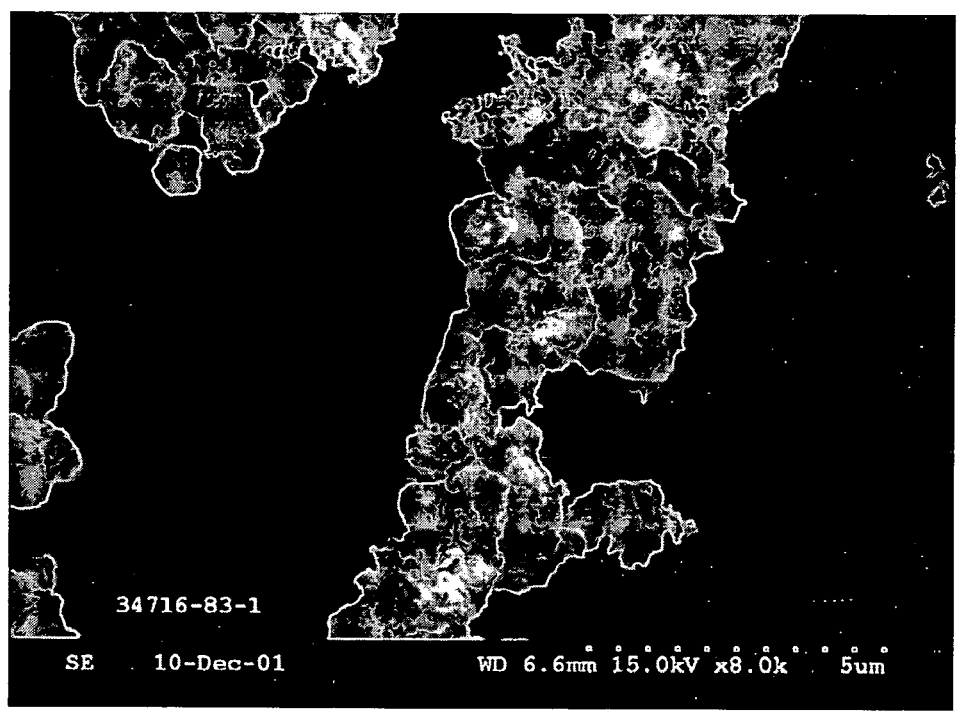
FIG. 6 is a scanning electron photomicrograph of a high-surface-area molybdenum carbide powder made from the ammonium dodecamolybdomolybdate compound of this invention.

A 50 g amount of AMM powder was placed in a nickel-alloy boat and reduced in a tube furnace supplied with hydrogen at 0.3-0.4 liter per minute. The sample was heated at 10° C. per minute to 530° C., held for 1 hour at 530° C., and then heated to 900° C. at 10° C. per minute. After a one hour hold at 900° C., 31 g of molybdenum metal powder were obtained. The molybdenum powder had a BET specific surface area of 2.99 m$^2$/g, an FSSS particle size of 0.9 microns and a porosity of 0.715. The powder generally consisted of aggregates having a mean diameter of 6.21 microns (FIG. 5). The bulk density of the submicron molybdenum metal powder was 16.04 g/in$^3$.

EXAMPLE 6

Preparation of the Aggregates of High Surface Area Mo$_2$C Powder from AMM

A 150 ml quantity of a molybdenum process by-product solution containing 59.2 g/l ammonia, >200 g/l molybdenum and elemental impurities such as potassium, phosphorus, tungsten, aluminum, sodium, boron, copper, arsenic, and silicon was diluted with 400 ml water and acidified with 120 ml 10-12N HCl. To this solution, 6.4 g of a high-surface-area carbon was added while mixing and the resulting suspension was heated at 80° C. for 3 hours. After cooling to room temperature, the solids were separated by filtration, washed with water, and dried at 110° C. The weight of the dried solids which contained carbon and AMM was 42 g.

An 8 g amount of AMM-carbon powder was heated in a nickel-alloy boat in the presence of a reducing atmosphere (0.3 l/min hydrogen) at 10° C./min. to 1040° C. After holding at 1040° C. for one hour, the sample was cooled to room temperature in the hydrogen atmosphere and removed from the boat. A total of 4.7 g of Mo$_2$C were obtained. The Mo$_2$C was measured to have a BET specific surface area of about 10 m$^2$/g.

While there has been shown and described what are at the present considered the preferred embodiments of the invention, it will be obvious to those skilled in the art that various changes and modifications may be made therein without departing from the scope of the invention as defined by the appended claims.

We claim:

1. A method for making a molybdenum metal powder comprising heating ammonium dodecamolybdomolybate in a reducing atmosphere at a temperature and for a time sufficient to form the metal powder.

2. The method of claim 1 wherein the ammonium dodecamolybdomolybdate is heated at a temperature from 5000° C. to 11000° C. for 2 hours to 6 hours.

3. The method of claim 1 wherein the particles of the molybdenum metal powder are mono-morphic having a dog-bone shape.

4. The method of claim 1 wherein the molybdenum metal powder has a submicron particle size.

5. A method for making a molybdenum carbide powder comprising:
   (a) combining an ammonium molybdate solution with a carbon powder;
   (b) precipitating ammonium dodecamolybdomolybdate from the ammonium molybdate solution;
   (c) recovering the solids containing the carbon and ammonium molybdomolybdate from the solution; and
   (d) heating the solids in a reducing atmosphere at a temperature and for a time sufficient to form the molybdenum carbide powder.

6. The method of claim 5 wherein the solids are heated at a temperature from 8400° C. to 1140° C. for 2 hours to 6 hours.

* * * * *